United States Patent [19]
Collette

[11] 4,093,895
[45] June 6, 1978

[54] ASSYMETRIC TOP-BOTTOM PINCUSHION CORRECTION CIRCUIT

[75] Inventor: Robert P. Collette, Elba, N.Y.

[73] Assignee: GTE Sylvania Incorporated, Stamford, Conn.

[21] Appl. No.: 682,640

[22] Filed: May 3, 1976

[51] Int. Cl.² .................................................. H01J 29/56
[52] U.S. Cl. ...................................... 315/371; 315/400
[58] Field of Search ........................ 315/400, 371, 370

[56] References Cited

U.S. PATENT DOCUMENTS

| | | | |
|---|---|---|---|
| 3,329,859 | 7/1967 | Lemke | 315/400 |
| 3,566,181 | 2/1971 | Figlewicz | 315/371 |
| 3,825,793 | 7/1974 | Dietz | 315/400 |

Primary Examiner—Maynard R. Wilbur
Assistant Examiner—T. M. Blum
Attorney, Agent, or Firm—Norman J. O'Malley; Robert T. Orner

[57] ABSTRACT

In a top-bottom pincushion correction circuit having a saturable reactor with a control winding coupled to a source of deflection current at a horizontal scan frequency and an output winding coupled to a source of deflection current at a vertical scan frequency, a means coupled to the control winding unbalances the waveform applied thereto from the source of deflection current at a vertical scan frequency to provide asymmetric top-bottom pincushion correction.

8 Claims, 1 Drawing Figure

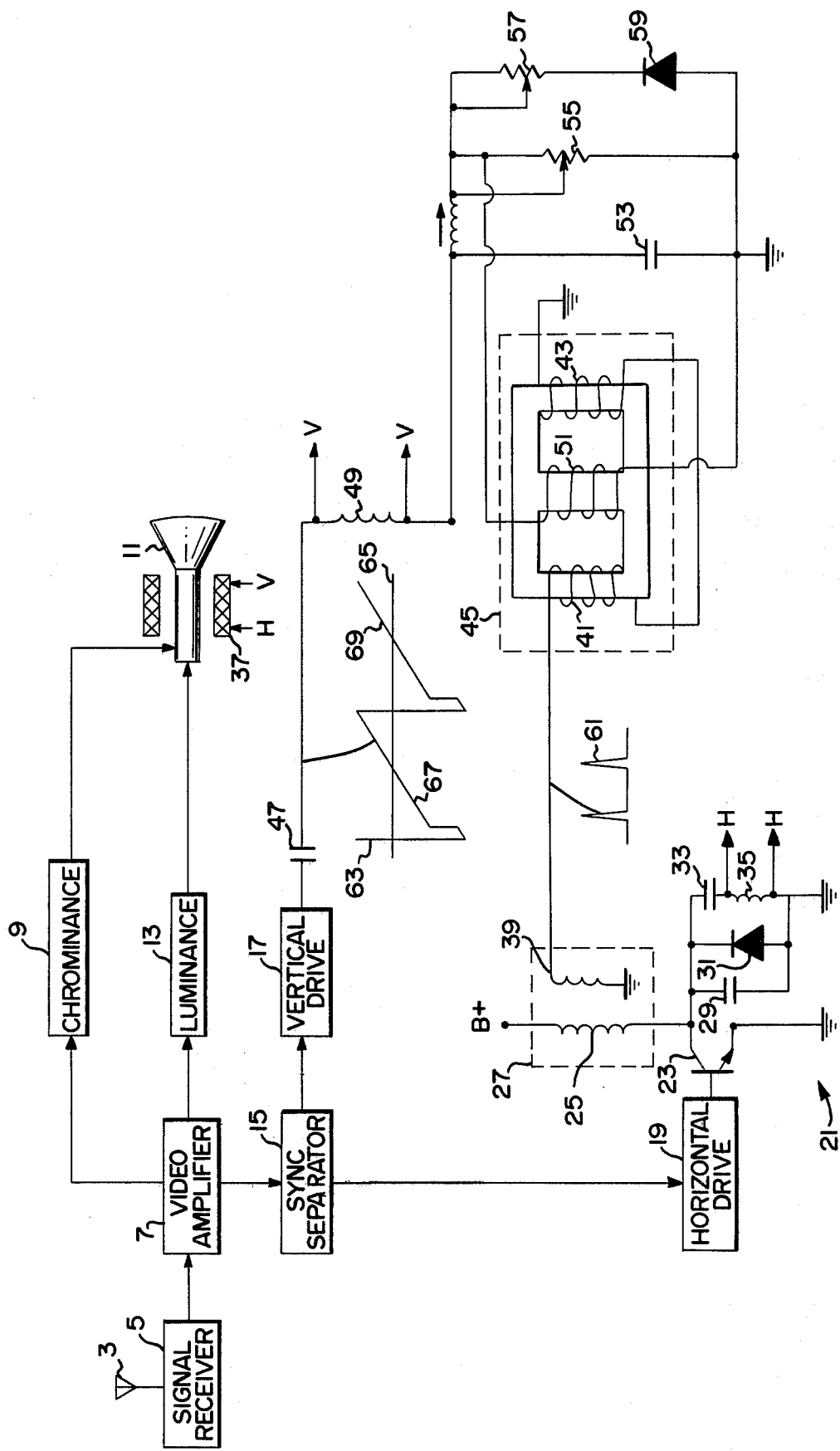

ASSYMETRIC TOP-BOTTOM PINCUSHION CORRECTION CIRCUIT

CROSS-REFERENCE TO OTHER APPLICATIONS

A co-pending application entitled "Top-Bottom Pincushion Correction Circuit" bearing U.S. Ser. No. 622,134, now U.S. Pat. No. 3,982,156, filed Oct. 14, 1975 in the name of Tex K. Monroe and assigned to the Assignee of the present application provides a pincushion correction circuit of improved efficiency wherein ringing current of a control winding are transferred to an output winding.

BACKGROUND OF THE INVENTION

This invention relates to top-bottom pincushion correction circuits and more particularly to apparatus for providing an unbalanced top-bottom pincushion correction signal.

As is well known in the cathode ray tube scanning art, the displayed raster of a cathode ray tube is composed of successively spaced horizontal scan lines forming a substantially rectangular-shaped raster. Although the raster is desirably rectangular under normal operation conditions, it is well known that such a desirable condition fails to exist in almost all instances and the raster is distorted in a manner which has become known as top-bottom pincushion distortion.

As is well-known, top-bottom pincushion distortion is indicated by the departure of the horizontal scan lines from a straight-line configuration. Specifically, the horizontal scan lines at the top half of the raster tend to bow downwardly toward the center while the horizontal scan lines at the bottom half of the raster tend to bow upwardly toward the center of the raster.

Also, it is well-known, many modern television receivers have picture tubes mounted near the floor or at least below the normal level of viewer observation. Thus, the average viewer looks down at the raster on the picture tube which has the effect of making normally straight lines near the top of the raster appear bowed inwardly at the center. At the bottom of the raster, the normally straight lines appear to be bowed outward or barrelled at the center of the raster.

One known prior art technique for overcoming the above-described distortion problems was to utilize a movable bias magnet whereby a magnetic field was employed to set up a field in the pincushion transformer to compensate for the distortions. In another method, a DC current was added to the ramp-like waveform of the pincushion correction voltage applied to the vertical windings of the deflection yoke in an effort to provide a desired upbalance in the resultant raster of the cathode ray tube.

Although the above-mentioned methods provided some relief and were reasonably successful, they did leave much to be desired. For example, altering the magnetic flux with a magnet or adding a DC current to effect unbalance of the pincushion correction waveform tends to undesirably alter the crossover point or the point whereat the waveform shifts from one polarity to the other. As a result, the total raster is affected rather than only the positive or negative portion of the waveform which requires correction.

OBJECTS AND SUMMARY OF THE INVENTION

An object of the present invention is to provide an improved cathode ray tube scanning system. Another object of the invention is to enhance the top-bottom pincushion correction of a cathode ray tube scanning system. Still another object of the invention is to provide improved apparatus for unbalancing the amount of top-bottom pincushion correction in a cathode ray tube scanning system. A further object of the invention is to provide circuitry for controlling the unbalance of a top-bottom pincushion control circuit.

These and other advantages and capabilities are achieved in one aspect of the invention by a top-bottom pincushion correction circuit having a saturable reactor with a control winding coupled to a source of deflection current at a horizontal scan frequency and an output winding coupled to a source of deflection current at a vertical scan frequency and a means coupled to the output winding for unbalancing the waveform applied thereto from the source of deflection current at a vertical scan frequency.

BRIEF DESCRIPTION OF THE DRAWINGS

The sole FIGURE is a block and schematic diagram of a television receiver utilizing a preferred form of asymmetric top-bottom pincushion correction circuitry.

PREFERRED EMBODIMENT OF THE INVENTION

For a better understanding of the present invention, together with other and further objects, advantages and capabilities thereof, reference is made to the following disclosure and appended claims in conjunction with the accompanying drawing.

Referring to the drawing, a color television receiver includes an antenna 3 for intercepting and applying transmitted color television signals to a signal receiver 5. The signal receiver 5 includes the usual radio frequency (RF), intermediate frequency (IF), and video amplifier and detector stages to provide a composite color video signal.

The composite color video signal from the signal receiver 5 is applied to a video amplifier stage 7. The video amplifier stage 7 provides an output signal which is applied to a chrominance signal channel 9 wherefrom are derived signals representative of color information in the transmitted signal. These color information signals from the chrominance signal channel 9 are applied to a color cathode ray tube 11 to effect the desired display of color information.

Another output from the video amplifier stage 7 is applied to a luminance signal channel 13 wherein signals representative of image information are derived and applied to the color cathode ray tube 11. Still another output from the video amplifier stage 7 is applied to a sync pulse separator stage 15 wherein sync pulse signals at the vertical scan rate are separated from the video signal and applied to a vertical drive circuit 17. Also, sync pulse signals at the horizontal scan rate are separated from the video signal and applied to a horizontal drive circuit 19.

The horizontal drive circuit 19 is coupled to a horizontal output circuit 21 which includes a transistor 23 having an emitter connected to circuit ground and a collector coupled by a winding 25 of a horizontal flyback transformer 27 to a potential source B+. A parallel connected capacitor 29 and damper diode 31 couple the collector of the transistor 23 to circuit ground while a series connected "S" curve correction capacitor 33 and a horizontal deflection yoke winding 35 shunt the parallel connected capacitor 29 and damper diode 31. The horizontal deflection yoke winding 35 is a part of a deflection yoke 37 associated with the cathode ray tube 11 as indicated by the arrows labeled "H".

A winding 39 on the horizontal flyback transformer 27 has one end grounded and the opposite end coupled to a pair of series connected control windings 41 and 43 disposed on an outer pair of leg members of a saturable reactor 45. The saturable reactor 45 is of the well-known "E" type construction and the control windings 41 and 43 are connected in a magnetically opposing manner to circuit ground.

An output from the vertical drive circuit 17 is AC coupled by a capacitor 47 to a vertical deflection yoke winding 49 which is a part of the deflection yoke 37 as indicated by the arrows labeled "V". The vertical deflection yoke winding 49 is coupled to an output winding 51 affixed to the center leg member of the saturable reactor 45. The output winding 51 is shunted by a capacitor 53 to provide a resonant circuit and an adjustable resistor 55 shunts the output winding 51 and capacitor 55 to provide for varying the Q of the resonant circuit.

Also, a series connected alterable impedance, depicted as an adjustable resistor, 57 and a unidirectional conduction device, illustrated as a diode 59, are shunted across the parallel connected output winding 51, capacitor 53, and alterable impedance 57. This series connected adjustable resistor 57 and diode 59 serve to effect unbalance of the waveform applied thereto whereby asymmetric top-bottom pincushion correction is effected without undesired alteration of the crossover point of the waveform.

As to operation, the winding 39 coupled to the flyback transformer 27 provides horizontal flyback pulse signals 61 which are applied to the series connected control windings 41 and 43 affixed to the saturable reactor 45. Since the control windings 41 and 43 are oppositely poled, they tend to drive horizontal flux through the center leg of the saturable reactor 45 in opposite directions. Thus, equal flux contributions from the control windings 41 and 43 cause cancellation of horizontal frequency flux variations whereupon no energy is transferred into the center leg whereon the output winding 51 is disposed. However, a difference in flux contribution by the control windings 41 and 43 produces horizontal frequency variations to the output winding 51.

As to dynamic control of the relative horizontal flux contributions, the vertical drive circuit 17 provides a vertical scanning current, waveform 63, having a crossover point 65 with a ramp-like portion 67 of one polarity and a ramp-like portion 69 of the opposite polarity. During a first portion of vertical scanning, the vertical scanning current, portion 67, induces a flux into the center leg of the saturable reactor 45 which opposes the flux linkages of the center leg to one outside leg and adds to the flux linkages of the center leg to the other outside leg. The opposite flux conditions exist when the second portion, portion 69, of the vertical scanning current is applied to the winding 51. Thus, a maximum amplitude of horizontal frequency signals is transferred to the output winding 51 when the vertical scanning current is maximum and a polarity crossover occurs intermediate the maximum horizontal signal amplitude transfer.

Additionally, an unbalance of the vertical scanning current, waveform 63, modulated by the horizontal frequency variations is obtainable by adding the series connected adjustable resistor 57 and diode 59. In accordance with the connections of the diode 59, the diode 59 is reverse biased and does not affect the resultant pincushion correction waveform when the correction waveform is of one polarity. However, when the polarity of the correction waveform reverses, the diode 59 conducts which causes the adjustable resistor 57 to load down the circuit and reduce the magnitude of the pincushion correction waveform.

Obviously, reversing the connections of the diode 59 will result in a reversal of the unbalance of the resultant pincushion correction waveform. The magnitude of the unbalance or correction is selectively chosen by altering the adjustable resistor 57. Moreover, it can readily be seen that the unbalance circuitry has no effect upon the crossover point 65 since loading of the circuitry is dependent upon current flow through the series connected resistor 57 and diode 59 whereas current flow is not present or at a minimum at the crossover point.

Thus, there has been provided a unique asymmetric top-bottom pincushion control circuit. The circuit is inexpensive of components and construction while enhancing the capabilities of a cathode ray tube scanning system. Also, the circuit provides a technique to effect unbalance of the top-bottom pincushion correction signals without undesired alterations in the crossover point of the correction signals. Moreover, the circuit provides apparatus for easily controlling the degree of unbalance desired.

While there has been shown and described what is at present considered the preferred embodiment of the invention, it will be obvious to those skilled in the art that various changes and modifications may be made therein without departing from the invention as defined by the appended claims.

What is claimed is:

1. In a cathode ray tube scanning system having a cathode ray tube with an associated deflection yoke which includes horizontal and vertical deflection windings coupled to a source of deflection current at horizontal and vertical scan frequencies and a top and bottom pincushion correction circuit having a saturable reactor with a control winding coupled to the source of deflection current at a horizontal scan frequency and an output winding coupled to a source of deflection current at a vertical scan frequency and to a shunt connected capacitor and impedance, the improvement comprising:
 means coupled to said output winding for unbalancing the waveform applied thereto from said source of deflection current at a vertical scan frequency to provide asymmetric top-bottom pincushion correction, said means of a form to provide a substantially constant crossover point of said waveform.

2. The improvement of claim 1 wherein said means for unbalancing the waveform applied to said control winding is in the form of a series connected unidirectional conduction device and impedance shunting said control winding.

3. The improvement of claim 2 wherein said series connected unidirectional conduction device and impedance are in the form of a series connected diode and alterable impedance.

4. The improvement of claim 2 wherein said impedance shunting said control winding is alterable to effect control of the amount of unbalance or asymmetry between top and bottom pincushion correction waveform.

5. In a top and bottom pincushion correction circuit for a cathode ray tube scanning system wherein the correction circuit includes a saturable reactor with a control winding coupled to a source of deflection current at a horizontal scan frequency and an output winding shunted by a parallel coupled capacitor and impedance and coupled to a source of deflection current at a vertical scan frequency, the improvement comprising:
 a series connected unidirectional conduction device and impedance coupled to said output winding for controlling the asymmetry of a top and bottom pincushion correction waveform.

6. The improvement of claim 5 wherein said means for controlling the assymetry of a top and bottom pincushion correction waveform is in the form of a series connected diode and alterable resistor shunting said control winding.

7. The improvement of claim 6 wherein said alterable resistor provides control of the amount of asymmetry of the top to bottom pincushion correction waveform.

8. The improvement of claim 6 wherein said series connected diode and alterable resistor effect unbalance of said pincushion correction waveform with respect to a substantially constant crossover point.

* * * * *